(12) United States Patent
Yang et al.

(10) Patent No.: US 11,397,554 B1
(45) Date of Patent: Jul. 26, 2022

(54) METHOD OF TRANSMITTING PARAMETERS FOR CONTROLLING DISPLAY SCREEN AND RELATED SCREEN CONTROL SYSTEM

(71) Applicant: NOVATEK Microelectronics Corp., Hsin-Chu (TW)

(72) Inventors: Chun-Tang Yang, Hsinchu (TW); Yung-Chieh Sun, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/158,028

(22) Filed: Jan. 26, 2021

(51) Int. Cl.
*G06F 3/147* (2006.01)

(52) U.S. Cl.
CPC .................... *G06F 3/147* (2013.01)

(58) Field of Classification Search
CPC ....................................................... G06F 3/147
See application file for complete search history.

(56) References Cited

U.S. PATENT DOCUMENTS 5,859,660 A * 1/1999 Perkins ............ H04N 21/23424
725/32
2016/0300549 A1* 10/2016 Zhang ................... G06F 3/1446

* cited by examiner

*Primary Examiner* — Shivang I Patel
(74) *Attorney, Agent, or Firm* — Winston Hsu (57) ABSTRACT

The present invention provides a method of transmitting parameters for controlling a display screen of a screen control system. The method is used in a first serial unit of the screen control system, and includes steps of: receiving a first parameter; performing parameter setting on the first serial unit according to the first parameter; calculating a second parameter according to the first parameter, wherein the second parameter is different from the first parameter; and transmitting the second parameter to a second serial unit of the screen control system.

10 Claims, 7 Drawing Sheets

METHOD OF TRANSMITTING PARAMETERS FOR CONTROLLING DISPLAY SCREEN AND RELATED SCREEN CONTROL SYSTEM

BACKGROUND OF THE INVENTION

1. Field of the Invention

The present invention relates to a screen control method and system, and more particularly, to a screen control method and system with transmission of parameter streams.

2. Description of the Prior Art

Nowadays, a splicing screen is widely applied to realize a large-scale display screen. The splicing screen, which may be implemented with the liquid crystal display (LCD) or light-emitting diode (LED) display technology, is able to broadcast information to crowds of people simultaneously. For example, a digital signage may be an LED splicing screen set up in a crowded place, to show various information such as advertisements, movies or traffic information to people. The splicing screen is usually composed of a plurality of light boxes, each having a display panel, a data splitter, and/or one or more drivers and controllers. The driver(s) and controller(s) may be used to drive and control the display panel to show the desired image. The data splitter, which may be implemented in each light box or implemented in the video source delivering the video data, is configured to divide and allocate the video data to be shown in each fragment of the splicing screen.

In order to control the splicing screen, a main controller (such as a video source or a computer) is capable of transmitting commands to set the controller in each of the light boxes. The light boxes are then able to receive video data after being set up. In general, after the splicing screen is constructed, a user should manually input commands to set up each light box one by one through the main controller. In addition, the large-scale splicing screen usually suffers from the electrostatic discharge (ESD) problem, which may erroneously modify the setting values of one or more light boxes, causing an abnormal display image. In such a situation, maintenance personnel should manually reset the abnormal light box and then deliver the correct command to recover the normal display image after discovering the abnormal position. In an example, a light box of the splicing screen may be damaged, and a new light box is deployed to replace the damaged one. Afterwards, this new light box should also be set up by manually inputting appropriate commands based on its position.

Therefore, the conventional splicing screen requires manual setting operations realized by inputting commands to each light box. The setting procedure is time consuming, especially for a high resolution screen composed of a great number of light boxes. Thus, there is a need for improvement over the prior art.

SUMMARY OF THE INVENTION

It is therefore an objective of the present invention to provide a novel screen control method and system, in order to solve the abovementioned problems.

An embodiment of the present invention discloses a method of transmitting parameters for controlling a display screen of a screen control system. The method is used in a first serial unit of the screen control system, and comprises steps of: receiving a first parameter; performing parameter setting on the first serial unit according to the first parameter; calculating a second parameter according to the first parameter, wherein the second parameter is different from the first parameter; and transmitting the second parameter to a second serial unit of the screen control system.

Another embodiment of the present invention discloses a screen control system, which comprises a plurality of serial units for controlling a display screen. A first serial unit of the plurality of serial units is configured to receive a first parameter; perform parameter setting on the first serial unit according to the first parameter; calculate a second parameter according to the first parameter, wherein the second parameter is different from the first parameter; and transmit the second parameter to a second serial unit among the plurality of serial units.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
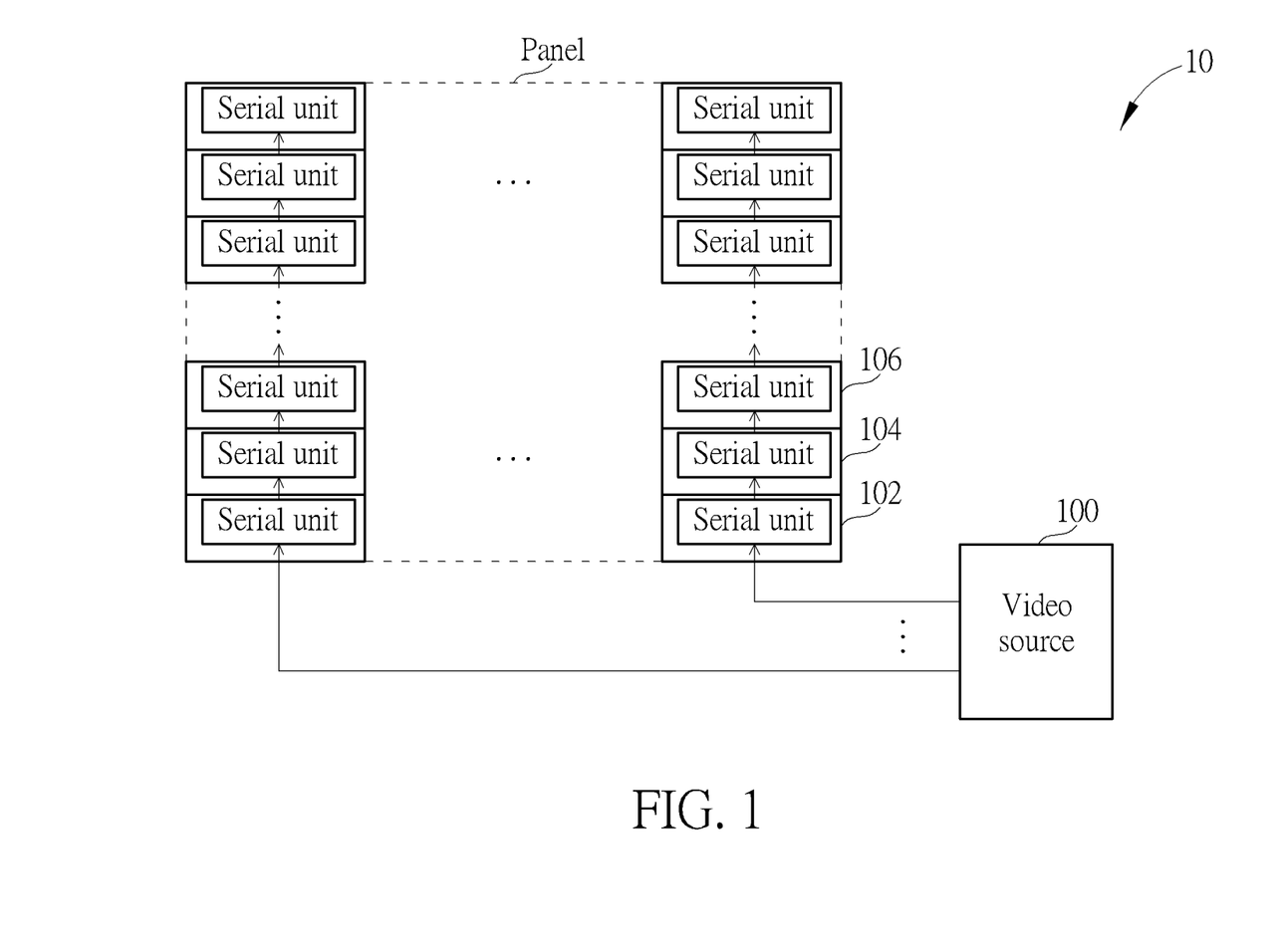
FIG. 1 is a schematic diagram of a screen control system according to an embodiment of the present invention.

Please refer to FIG. 1, which is a schematic diagram of a screen control system 10 according to an embodiment of the present invention. As shown in FIG. 1, the screen control system 10 includes a plurality of serial units. Each of the serial units may be a light box having a display panel, a data splitter, and/or one or more drivers and controllers. The display panels of the serial units are used to construct a splicing screen. In other words, the splicing screen is composed of a plurality of display panels respectively included in a plurality of serial units. For example, if the splicing screen is a light-emitting diode (LED) splicing screen, the display panel of each serial unit may include an LED pixel array to be served as a fragment of the screen.

A video source 100, which may be included in the screen control system 10 or independent of the screen control system 10, is shown in FIG. 1 to facilitate the illustrations. The video source 100 may deliver parameters for setting the serial units and also deliver video data to be shown on the screen. The parameters may be used to set the controllers of the serial units, where the controllers may be a control circuit (e.g., integrated circuit (IC)) implemented in one or more chips. The controllers should be set up by receiving the parameters, and may be able to process the video data after being set up completely and successfully. The video source 100 may be implemented with a video board, which may carry a main controller and/or may be connected to a computer. The video board may receive video content through a video interface such as the digital visual interface (DVI), high-definition multimedia interface (HDMI), video graphics array (VGA) or display port (DP), and convert the video content into video data receivable by the controllers of the serial units. Therefore, the video data may be transmitted to each serial unit through a high speed serial interface such as the V-by-One interface, and the controller of each serial unit may include a V-by-One receiver for receiving the video data.

According to the connections as shown in FIG. 1, the serial units are allocated as an array. The video source 100 may transmit parameters to the bottommost serial unit of each column, and each serial unit (except for the topmost serial units) may transmit parameters upwards; i.e., transmit parameters to the upper serial unit in the same column. For example, the serial unit 102 may receive parameters from the video source 100 and transmit parameters to the serial unit 104, the serial unit 104 may receive parameters from the serial unit 102 and transmit parameters to the serial unit 106, and so on.

Figure 2:
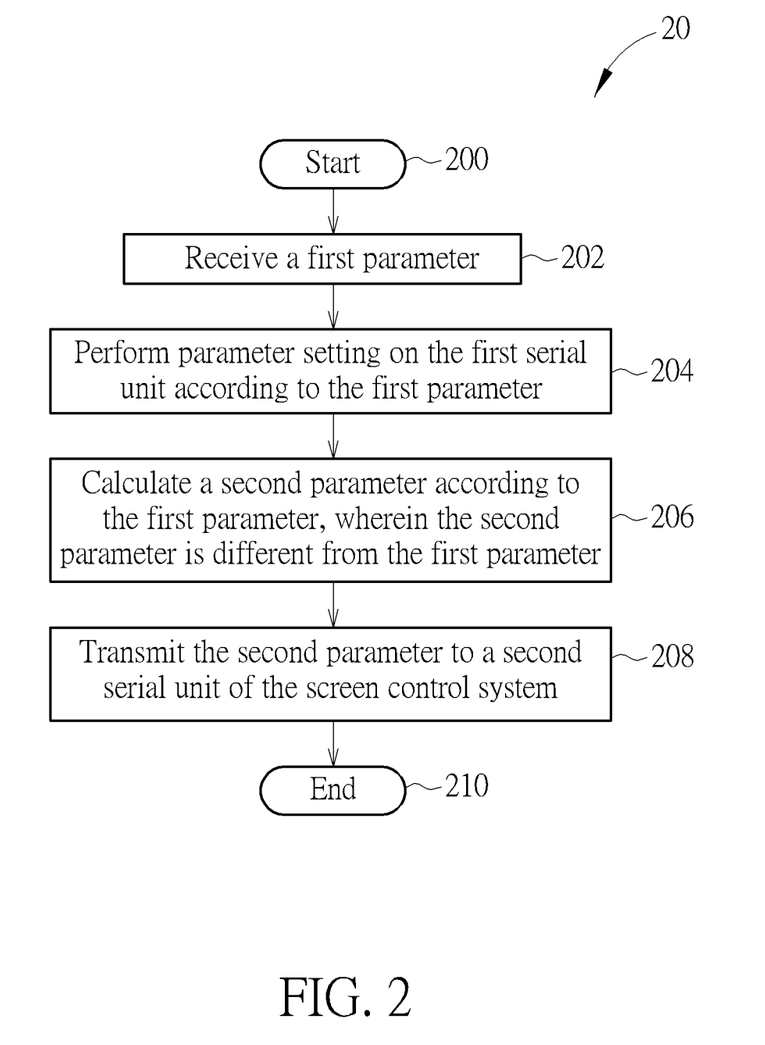
FIG. 2 is a flowchart of a screen control process for a serial unit of the screen control system according to an embodiment of the present invention.

Please refer to FIG. 2, which is a flowchart of a screen control process 20 for a serial unit of the screen control system according to an embodiment of the present invention. As shown in FIG. 2, in order to complete the parameter setting of each serial unit, a first serial unit of the screen control system may be configured to perform the following steps:

Step 200: Start.
Step 202: Receive a first parameter.
Step 204: Perform parameter setting on the first serial unit according to the first parameter.
Step 206: Calculate a second parameter according to the first parameter, wherein the second parameter is different from the first parameter.
Step 208: Transmit the second parameter to a second serial unit of the screen control system.
Step 210: End.

To facilitate the illustrations, the serial unit 102 may be considered as the first serial unit that performs the steps of the screen control process 20. According to the screen control process 20, the serial unit 102 may receive the first parameter from the video source 100, and thereby perform its parameter setting according to the first parameter. The first parameter may be any parameter capable of controlling the display operation and optimizing the display image, such as an address parameter, a display parameter and a delay parameter. In addition, the serial unit 102 may calculate the second parameter used for the serial unit in the next stage (i.e., the serial unit 104) according to the first parameter, where the second parameter may be different from the first parameter. The serial unit 102 then transmits the second parameter to the serial unit 104. Therefore, the serial unit 104 may perform its parameter setting according to the second parameter.

Similarly, the serial unit 104 may calculate another parameter for the serial unit in the next stage (i.e., the serial unit 106) according to the second parameter, and then transmit the calculated parameter to the serial unit 106. In this manner, the video source 100 only needs to deliver parameters to one or several serial units directly connected to the video source 100. The parameters for other serial units may be calculated by their previous serial units, and the parameter setting of the entire screen may be completed accordingly.

Therefore, if a serial unit receives parameters from its previous stage (which may be the video source or the previous serial unit), it may automatically perform calculation to obtain new parameters, and forward the new parameters to the next stage. As a result, after the splicing screen is constructed, the video source 100 only needs to output parameters to one or several serial units in the first stage; hence, the manual setting for all serial units may be omitted, which significantly saves the time requirements of the setting procedure.

Please note that the parameter (s) of the present invention may be transmitted automatically and periodically. For example, the video source 100 may transmit the parameters in the blanking intervals of each frame. The blanking intervals, including horizontal blanking intervals between different lines of video data and/or vertical blanking intervals between different frames of video data, may be utilized to deliver the parameters. Alternatively or additionally, the dummy bits of video data may be utilized to transmit the parameters. For example, in the V-by-One interface, there may be several dummy bits in the video data bytes. The dummy bits do not carry any video or image information, but they are transmitted with the video data to fulfill the transmission standard. Therefore, the parameters may be carried in these dummy bits and transmitted to the serial unit, in order to efficient utilize the transmission capacity of the system. In this manner, each serial unit may obtain the complete parameter stream by collecting the parameter bit values from the blanking intervals and/or the dummy bits.

Accordingly, the parameters may be delivered periodically; that is, the video source 100 may continuously output the parameters in every one frame or every several frames. If an ESD spike modifies the setting value of a serial unit to be wrong or if a serial unit is damaged and replaced by a new one, the parameter setting of this serial unit may be automatically complete by receiving the parameters in the next frame time. For example, the correct setting values may be stored in a register of the serial unit during operations of the serial unit. The serial unit may continuously receive parameters from its previous stage. If the serial unit discovers that the received parameters are different from the stored parameters, it may determine that the stored parameters may be wrong or the parameter values have been modified, and thereby recover the correct setting or change the setting based on the newly received parameters. As a result, the serial unit interfered with by ESD may rapidly recover the correct setting values. In addition, a substitute serial unit may be set up automatically and rapidly, and thus the maintenance costs of replacing the damaged serial unit may be minimized.

Please note that the serial unit is requested to calculate the parameters for the next stage, and should be capable of calculating functions. In an embodiment, each serial unit includes a controller, which not only controls the display operations on the corresponding screen fragment, but also performs calculation to obtain the parameters for setting the serial unit (s) in the next stage. In another embodiment, the serial unit may include a data splitter, which is served to calculate the parameters for setting the serial unit (s) in the next stage.

In the embodiment as shown in FIG. 1, the video source 100 is coupled to the bottommost serial unit of each column, and the serial units in each column are coupled in series.

Figure 3:
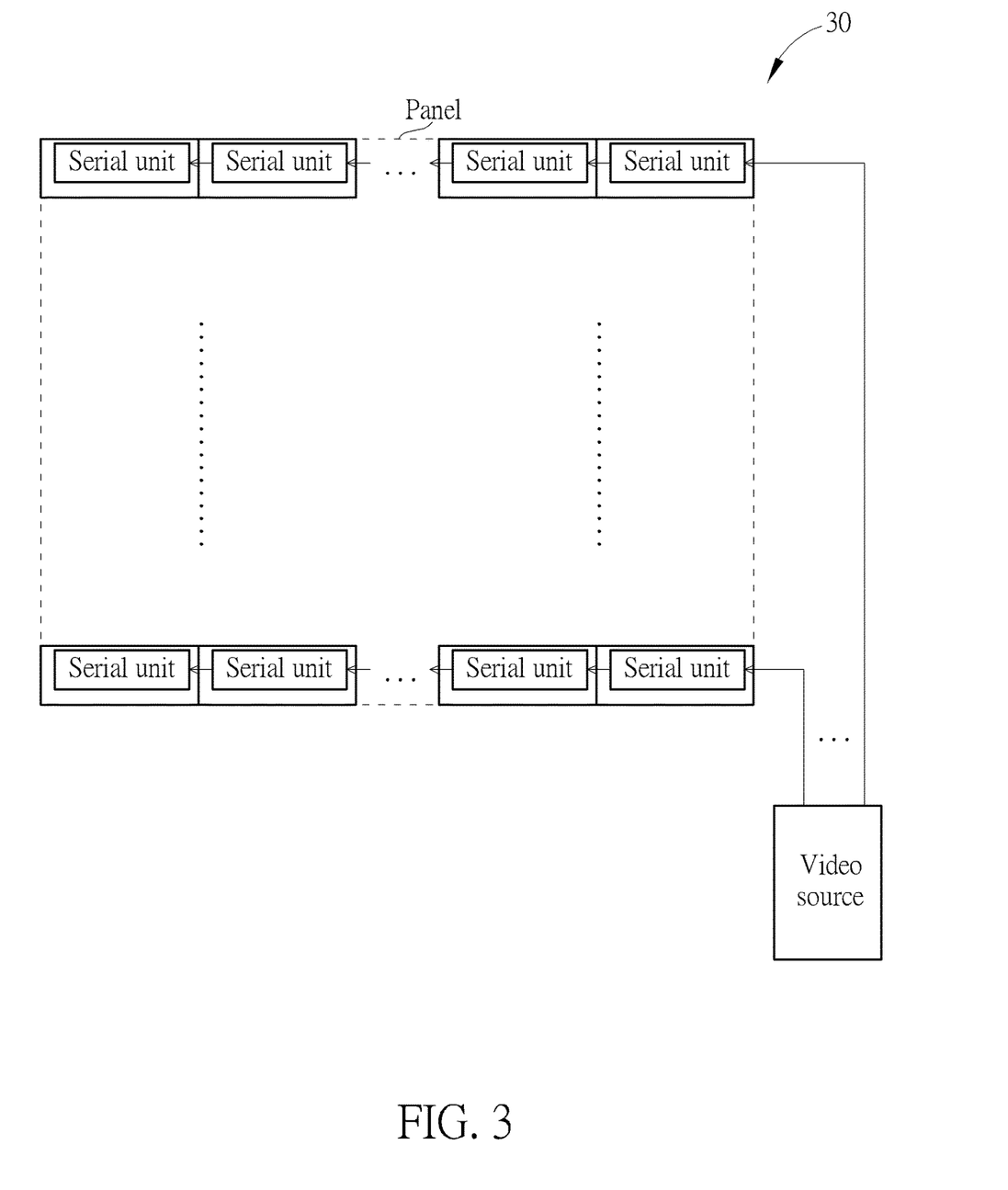
FIGS. 3 and 4 are schematic diagrams of other screen control systems according to embodiments of the present invention.
Figure 4:
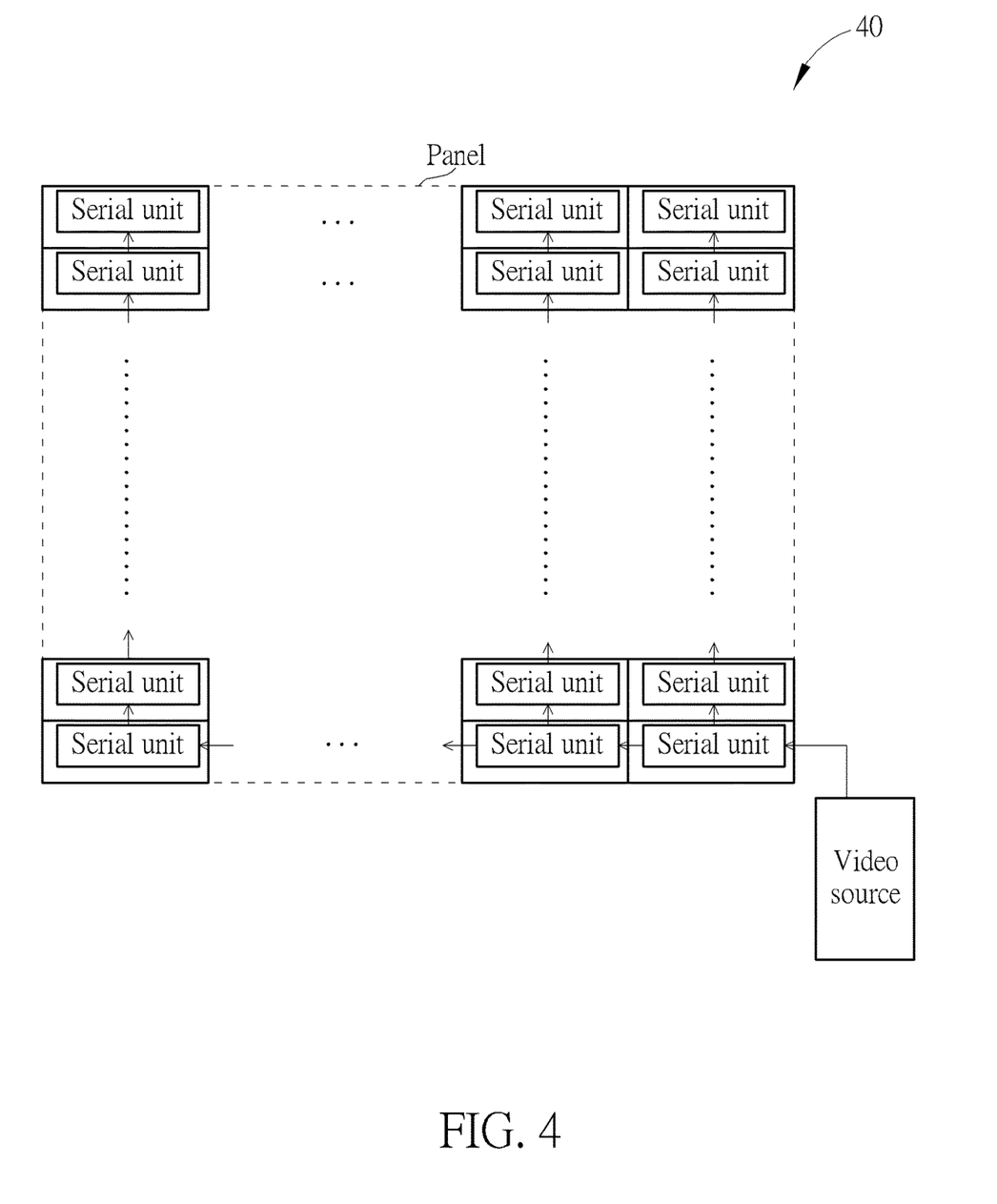

Therefore, the video source 100 may transmit the parameters to the bottommost serial unit of each column, and each serial unit may transmit the calculated parameters upwards. In another embodiment, a video source may be coupled to the rightmost serial unit of each row, and the serial units in each row are coupled in series, as the screen control system 30 shown in FIG. 3. In this implementation, the video source may transmit the parameters to the rightmost serial unit of each row, and each serial unit may transmit the calculated parameters leftwards. In a further embodiment, a video source may transmit the parameters to only one serial unit, and the calculated parameters may be forwarded to each serial unit from this serial unit. For example, as the screen control system 40 shown in FIG. 4, the video source may transmit the parameters to the serial unit at the lower right corner. This serial unit may transmit the calculated parameters to its upper serial unit and left serial unit. In this embodiment, the parameters may be forwarded leftwards to each serial unit in the bottommost row, and all serial units in the bottommost row may transmit the parameters upwards, allowing the serial units in the overall screen to receive their corresponding parameters. In fact, the parameters may be transmitted in any direction, i.e., in the horizontal direction or the vertical direction, based on the structure and connection of the serial units. As long as the serial unit is capable of calculating the parameters for the next stage and transmitting the calculated parameters to the next serial unit, the related parameter transmission method and system should belong to the scope of the present invention.

Figure 5:
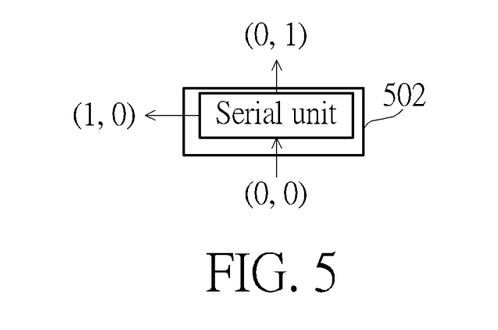
FIG. 5 illustrates the transmission of the address parameter for a serial unit.

In an embodiment, the parameters may include an address parameter, which is served to assign an address to each serial unit, e.g., based on the position of the serial unit. The address parameter may be transmitted when the screen is constructed. After the address parameter is set up, the serial unit may be able to receive a command based on the address carried in the command. FIG. 5 illustrates the transmission of the address parameter for a serial unit 502. As shown in FIG. 5, the serial unit 502 may receive an address parameter (0, 0) from its previous stage. The serial unit 502 then calculates the address parameter for the serial unit in the next stage based on the received address parameter and the connection way. If the address parameter is to be sent to the next serial unit connected in the horizontal direction, the x-coordinate value will be increased by 1, and the calculated address parameter will be (1, 0). If the address parameter is to be sent to the next serial unit connected in the vertical direction, the y-coordinate value will be increased by 1, and the calculated address parameter will be (0, 1). In this manner, each serial unit may calculate the address parameter for the serial unit in the next stage, and all serial units may receive the dedicated address parameter to complete the address setting.

Figure 6:
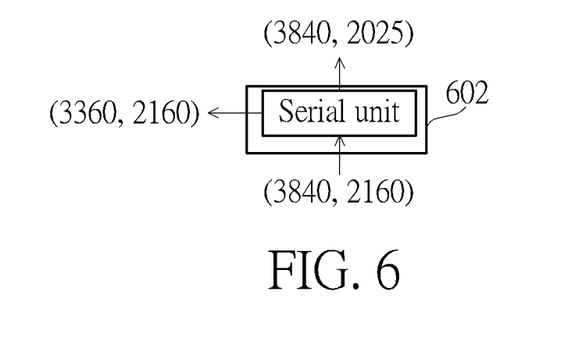
FIG. 6 illustrates the transmission of the display parameter for a serial unit.

In an embodiment, the parameters may include a display parameter, which is configured to instruct each serial unit to be responsible for displaying which part of the image frame. In general, the display panel of each serial unit is configured to show a part of the overall image frame, and the display parameter may inform the serial unit of the image range and size to be dealt with by the serial unit.

FIG. 6 illustrates the transmission of the display parameter for a serial unit 602. As shown in FIG. 6, the serial unit 602 may receive a display parameter (3840, 2160) from its previous stage. In this embodiment, the screen may be a 4K ultra high definition (4K-UHD) screen, of which the resolution is 3840×2160. The splicing screen is composed of 8×16 serial units, and each serial unit is responsible for 480×135 pixels. The serial unit 602 may be in the first stage that receives the display parameter (3840, 2160) from the video source. The serial unit 602 is configured to control the display of 480×135 pixels on the screen. Therefore, based on the display parameter (3840, 2160), the serial unit 602 may know that it is responsible for the image block ranging from the $3361^{st}$ column to the $3840^{th}$ column and from the $2026^{th}$ row to the $2160^{th}$ row.

In addition, the serial unit 602 is requested to calculate the display parameter for the serial unit in the next stage based on the received display parameter and the connection way. If the display parameter is to be sent to the next serial unit connected in the horizontal direction, e.g., sent to a serial unit at the left-hand side, the serial unit 602 may determine that this left serial unit is served to control the pixels at left columns and the same rows. Therefore, the serial unit 602 may calculate the display parameter value of horizontal direction by subtracting 480 from 3840, to obtain the parameter value 3360; hence, the serial unit 602 may transmit the display parameter (3360, 2160) to the left serial unit. If the display parameter is to be sent to the next serial unit connected in the vertical direction, e.g., sent to a serial unit at the upper side, the serial unit 602 may determine that this upper serial unit is served to control the pixels at upper rows and the same columns. Therefore, the serial unit 602 may calculate the display parameter value of vertical direction by subtracting 135 from 2160, to obtain the parameter value 2025; hence, the serial unit 602 may transmit the display parameter (3840, 2025) to the upper serial unit, as shown in FIG. 6.

In this manner, each serial unit may calculate the display parameter by modifying the parameter value of horizontal direction and/or vertical direction based on the connection way and the pixel counts corresponding to the serial unit. Therefore, each serial unit may receive the dedicated display parameter from the previous stage, and the display settings of all serial units may be completed accordingly. Each serial unit will capture the video data of the corresponding pixels based on their respective display setting, so that the entire image of the screen may be shown correctly. Furthermore, since the video source may periodically deliver the display parameter, the image may be recovered automatically when an abnormal display due to ESD appears.

Figure 7:
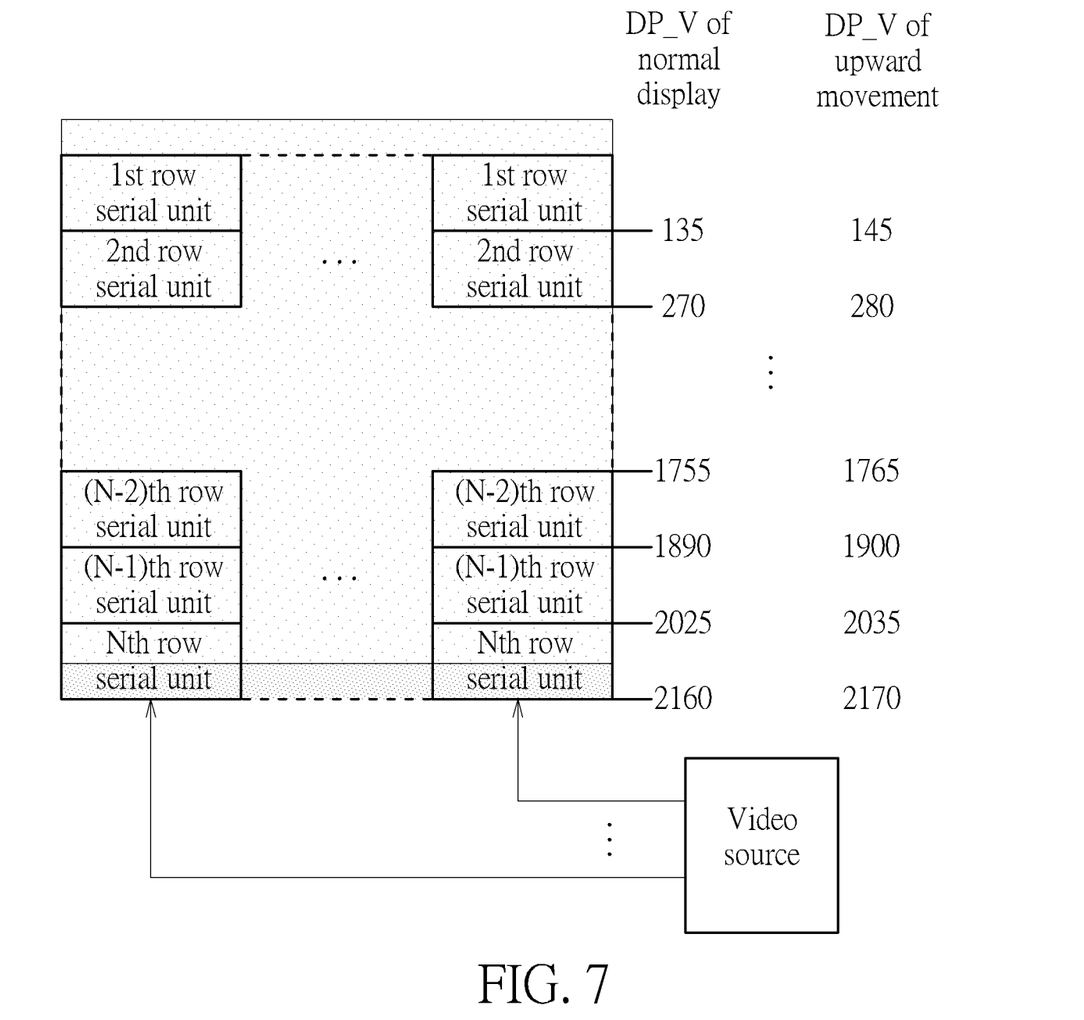
FIG. 7 is a schematic diagram of a screen control system and related display parameters for the serial units.

In an embodiment, the display parameter may be used to control the image to move toward any direction. For example, an application may require an image frame to move horizontally or vertically on the screen, and this may be easily achieved by modifying the display parameter. Please refer to FIG. 7, which is a schematic diagram of a screen control system 70 and related display parameters for the serial units. As shown in FIG. 7, the screen control system 70 includes N rows of serial units, and the serial units in each column are connected in series as similar to the connection way shown in FIG. 1. FIG. 7 shows the vertical display parameter DP_V that indicates the image rows to be shown on the display panel of each serial unit. In order to show the image frame normally, the vertical display parameter DP_V delivered by the video source may be 2160. Each serial unit is configured to show an image block having 135 rows of pixels, and thereby generates a new vertical display parameter DP_V (i.e., 2025, 1890, 1755, . . . , etc.) by subtracting 135 from the received vertical display parameter DP_V and then sends the new vertical display parameter DP_V to the upper serial unit.

When the image frame needs to move upwards, the vertical display parameter DP_V may be correspondingly modified. In detail, in order to achieve the upward movement in a specific image frame, the video source may deliver a larger vertical display parameter DP_V 2170 before the frame data are transmitted. Similarly, each serial unit generates a new vertical display parameter DP_V (i.e., 2035, 1900, 1765, . . . , etc.) by subtracting 135 from the received vertical display parameter DP_V and then sends the new vertical display parameter DP_V to the upper serial unit; that is, the calculation way for the display parameter is also applicable to the moved image frame. In such a situation, the displayed image frame may move upwards, where the upmost 10 rows of images may be cut off, and the pixels in the bottommost 10 rows may show black images.

In the same way, the downward movement of the image frame may also be achieved by decreasing the vertical display parameter DP_V outputted by the video source. In addition, the video source may modify the display parameter for horizontal direction to realize a horizontal movement. As a result, by adjusting the display parameter, the display image may move upwards, downwards, leftwards and/or rightwards immediately.

Figure 8:
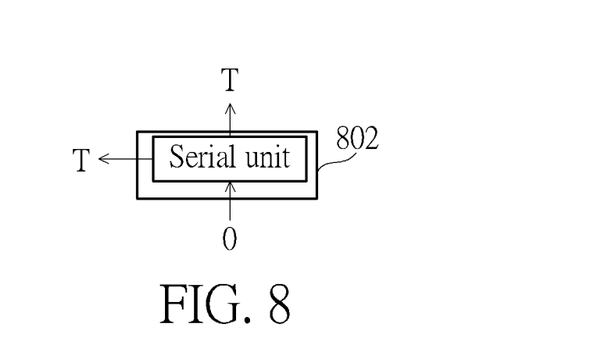
FIG. 8 illustrates the transmission of the delay parameter for a serial unit.

In an embodiment, the parameters may include a delay parameter, which is served to control the delay time for outputting the video data to the display panel for each serial unit. Due to the serial connections between the serial units, the video data may arrive at the serial units in different stages with a delay time. In a large-scale splicing screen having a large number of serial units, the delay time may be accumulated from the first stage to the last stage, resulting in screen tearing if the delay time exceeds the frame refresh rate. Therefore, it is preferable to configure the delay parameter to synchronize the output time of the video data for each serial unit. In other words, the delay parameter may adjust the delay time, allowing each serial unit to output the video data to the display panel at approximately the same time.

FIG. 8 illustrates the transmission of the delay parameter for a serial unit 802. As shown in FIG. 8, the serial unit 802 may receive a delay parameter 0 from its previous stage. More specifically, the serial unit 802 may be in the first stage that receives the delay parameter 0 from the video source. In addition, each serial unit of the screen control system may know that it requires a time unit T for the video data to be transmitted to the next stage from the present stage. Therefore, each serial unit may calculate the delay parameter for the serial unit in the next stage based on the received delay parameter and the connection way. In this embodiment, the serial unit 802 may add a time unit T to the received delay parameter 0, to generate the new delay parameter T and send it to the serial unit in the next stage. Similarly, the serial unit that receives the delay parameter T may output the delay parameter 2T to the next stage, the serial unit that receives the delay parameter 2T may output the delay parameter 3T to the next stage, and so on. Note that the delay time of the video data transmitted between every two adjacent serial units may be approximately equal. This delay time is mainly determined from the processing time of reception, calculation and transmission of the serial unit, and may be substantially identical since each serial unit has the same structure.

Therefore, the delay parameters 0, T, 2T . . . etc. may indicate the delay time of the video data received by the serial unit, and the serial unit should adjust the time of outputting video data based on the received delay parameter. In general, each serial unit may include a frame buffer, and the frame of video data received in series may be stored in the frame buffer and then outputted to the display panel simultaneously. The serial unit may control the time point of outputting the video data from the frame buffer based on the display parameter. For example, if the received delay parameter is larger, the serial unit may know that the video data is received with a larger delay time, and thereby output the video data from the frame buffer with a smaller delay. If the received delay parameter is smaller, the serial unit may know that the video data is received with a smaller delay time, and thereby output the video data from the frame buffer with a larger delay. As a result, the video data may be outputted to the display panel on approximately the same time point, to be shown on the screen simultaneously.

Figure 9:
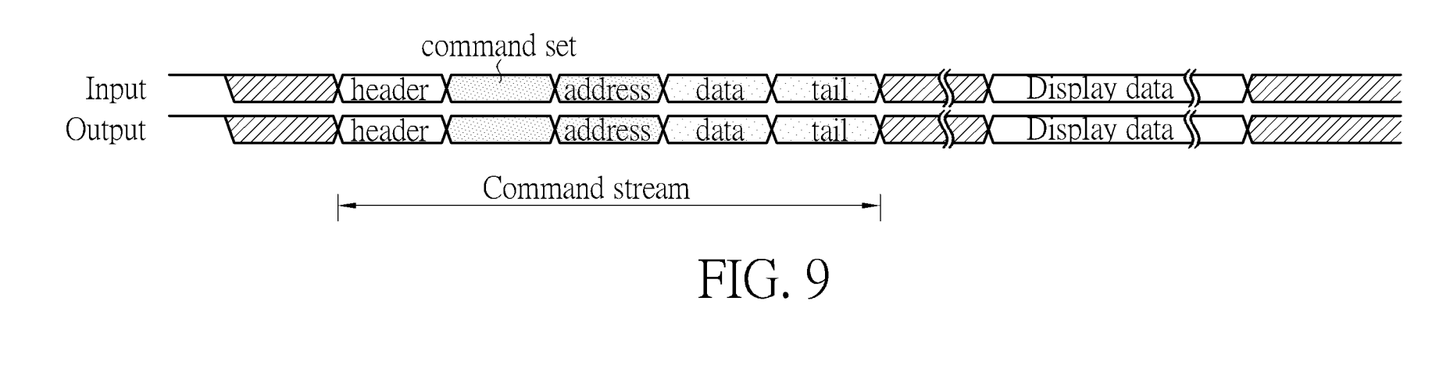
FIG. 9 is a schematic diagram of the format of a command stream.

In a conventional splicing screen, the serial units (such as the light boxes) are set up through commands delivered from the main controller. Please refer to FIG. 9, which is a schematic diagram of the format of a command stream. FIG. 9 illustrates a series of input signals and a series of output signals of a serial unit, where the input signals and the output signals both include a command stream and a data stream following the command stream. The data stream may include a series of video data. The serial unit receives the input signals from the previous stage, and correspondingly forwards the output signals to the next stage, where the output signals are the same as the input signals.

In this example, the command stream includes a header, command set, address, command data and tail. The header includes a specific bit pattern indicating the beginning of the command stream. The serial unit may identify that the command stream arrives when detecting several bits conforming to the header. The command set indicates the type of the command stream. The address indicates that this command stream is to be received and processed by which serial unit. The serial unit may identify the address to determine whether the command data is used for itself. The command data are the content of the command stream, and the serial unit may write the setting values based on the command data. The tail includes several bits used to check whether the command stream is correctly received. In the prior art, after the splicing screen is constructed, a user may manually input commands to set up each serial unit one by one, in order to light on the screen.

In comparison, in the embodiments of the present invention, the parameter provides functions as similar to the command; that is, the parameter may also be used to set up the serial unit. In an embodiment, the parameter stream is applied to replace the command stream. Alternatively, the serial unit may be set up through the command stream and also through the parameter stream. The video source may periodically transmit parameters to the serial unit(s) in the first stage, and the serial unit(s) may calculate the parameters to be sent to the serial unit(s) in the next stage.

Figure 10:
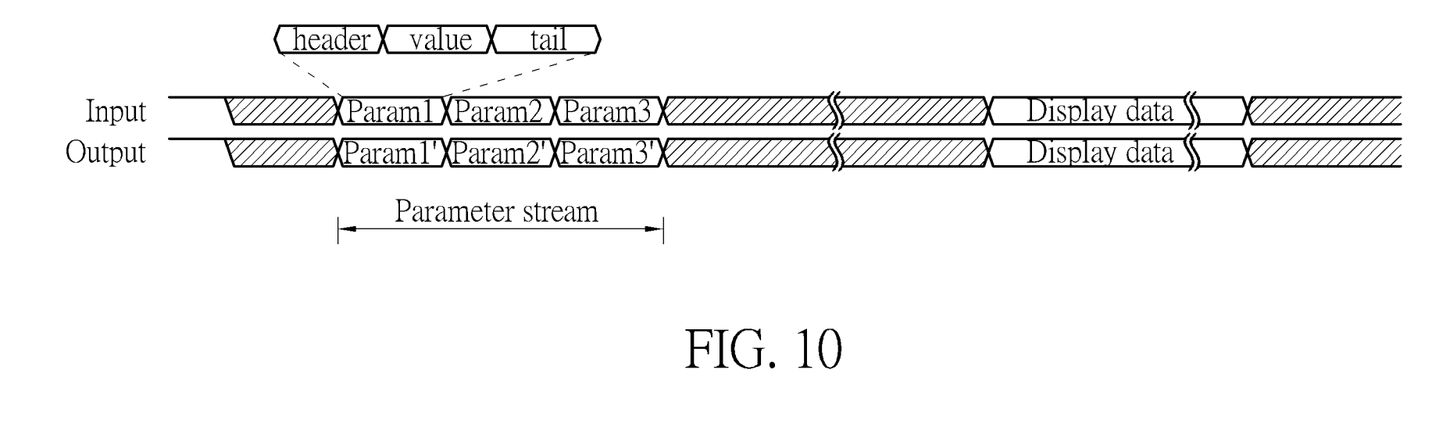
FIG. 10 is a schematic diagram of the format of a parameter stream.

In an embodiment, a parameter stream may include a header, parameter values and a tail. For example, please refer to FIG. 10, which is a schematic diagram of the format of a parameter stream. FIG. 10 illustrates a series of input signals and a series of output signals of a serial unit, where the input signals and the output signals both include a parameter stream and a data stream following the parameter stream. In this embodiment, the serial unit may receive parameter streams Param1, Param2, Param3, etc. and correspondingly output parameter streams Param1', Param2', Param3', etc. to the next stage. For example, the parameter stream Param1' may be generated from the parameter stream Param1; that is, the serial unit may calculate the parameter stream Param1' based on the received parameter stream Param1, and the values of the parameter stream Param1 may be different from the values of the parameter stream Param1'.

In detail, each parameter stream may include a header, parameter values, and a tail. Similar to the header of the command stream, the header of the parameter stream is used to identify the arrival of the parameter stream. In an embodiment, the header may also indicate that this parameter stream is used to write which register or is of which type. Therefore, the serial unit may determine the type of the parameter based on the header, and thereby set the corresponding register. For example, the header may include information indicating that this parameter stream includes an address parameter, a display parameter and/or a delay parameter. In such a situation, the header of the parameter stream may carry information similar to those carried in both the header and the command set of the command stream.

The parameter values refer to the setting values to be written into the specified register (s). As mentioned above, as for an address parameter, the parameter values may include the horizontal and/or vertical address for the serial unit; as for a display parameter, the parameter values may include horizontal and/or vertical coordinates indicating the display region that the serial unit is responsible to control; as for a delay parameter, the parameter values may be used for adjusting the delay settings of the serial unit.

The tail of the parameter stream is similar to the tail of the command stream. The tail may provide the function of error detection. In an embodiment, the tail may include a checksum field, which allows the serial unit to check whether the parameter stream is correctly received. The serial unit may determine whether the received parameter is correct or not based on the validation of checksum. The parameter may be discarded if the checksum indicates a wrong result. In another embodiment, the tail may include a cyclic redundancy check (CRC) code, which is also served to check whether the parameter stream is correctly received. In addition, the tail may include a specific bit pattern indicating the end of the parameter stream, and the serial unit may determine that the parameter stream is completely received by identifying the tail.

Upon receiving the parameter streams, the serial unit may calculate the parameter values for the next stage, and thus the values of the parameter streams (param1', param2', param3') may be different from the values of the received parameter streams (param1, param2, param3). Correspondingly, their tails may also be different since the checksum or CRC code should be recalculated based on the parameter values.

Please note that the address parameter included in the parameter stream is different from the address field of the command stream. As mentioned above, the address parameter is used to set the address of the serial unit. In another aspect, the address of the command stream indicates that this command stream is used to set up which serial unit, where each serial unit has been configured with a respective address and should be able to determine whether to receive and process the command stream or merely forward the command stream to the next stage based on the address information included in the command stream.

Please also note that the present invention aims at providing a screen control method and system capable of transmitting parameters for setting the serial units. Those skilled in the art may make modifications and alterations accordingly. For example, the screen control system of the present invention may be applied to a splicing screen, which may be an LED screen, a mini-LED screen or a micro-LED screen. In another embodiment, the screen control system of the present invention may also be applied to another type of splicing screen such as a liquid crystal display (LCD) screen. In addition, in the above embodiments, the serial unit may transmit the parameters through the V-by-One interface. In another embodiment, other high speed serial interface such as the mobile industry processor interface (MIPI) may also be feasible.

To sum up, the present invention provides a screen control method for controlling parameter transmissions and a related screen control system. The screen control system is composed of a plurality of serial units such as the light boxes. The video source may transmit a parameter to the serial unit(s) in the first stage, and each serial unit may calculate a new parameter based on the received parameter, and transmit the new parameter to the serial unit (s) in the next stage. The parameter may be used to set up the corresponding serial unit. For example, the address parameter is used to set the address of the serial unit, the display parameter is used to set the display region of the serial unit, and the delay parameter is used to set the delay configuration of the serial unit to synchronize the output of video data. In an embodiment, the video source may periodically transmit the parameters in every one frame or every several frames; hence, if the display image is interfered with by ESD, the setting values of the serial unit may be corrected automatically, allowing the display image to recover immediately. If a serial unit is damaged and replaced by a new one, this new serial unit can be rapidly set up through the periodically transmitted parameters. As a result, the serial units constructing the splicing screen may be set up through the parameter streams, and the setting speed and convenience may be significantly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of transmitting parameters for controlling a display screen of a screen control system, the display screen commonly controlled by a plurality of serial units connected in series, each of the plurality of serial units configured to control a portion of the display screen, the method being used in a first serial unit of the plurality of serial units, the method comprising:
receiving a first parameter;
performing parameter setting on the first serial unit according to the first parameter;
calculating a second parameter according to the first parameter, wherein the second parameter is different from the first parameter; and
transmitting the second parameter to a second serial unit of the screen control system.

2. The method of claim 1, wherein the second parameter is used for parameter setting of the second serial unit.

3. The method of claim 1, wherein each of the first parameter and the second parameter is one of an address parameter, a display parameter and a delay parameter.

4. The method of claim 1, wherein the first parameter is transmitted periodically.

5. The method of claim 1, wherein a format of each of the first parameter and the second parameter comprises a header, a parameter value and a tail, wherein the parameter value of the first parameter is different from the parameter value of the second parameter.

6. A screen control system, comprising a plurality of serial units for commonly controlling a display screen and connected in series, each of the plurality of serial units configured to control a portion of the display screen, a first serial unit of the plurality of serial units being configured to:

receive a first parameter;

perform parameter setting on the first serial unit according to the first parameter;

calculate a second parameter according to the first parameter, wherein the second parameter is different from the first parameter; and transmit the second parameter to a second serial unit among the plurality of serial units.

7. The screen control system of claim 6, wherein the second parameter is used for parameter setting of the second serial unit.

8. The screen control system of claim 6, wherein each of the first parameter and the second parameter is one of an address parameter, a display parameter and a delay parameter.

9. The screen control system of claim 6, wherein the first parameter is transmitted periodically.

10. The screen control system of claim 6, wherein a format of each of the first parameter and the second parameter comprises a header, a parameter value and a tail, wherein the parameter value of the first parameter is different from the parameter value of the second parameter.

\* \* \* \* \*